(12) United States Patent
Chen et al.

(10) Patent No.: US 12,021,269 B2
(45) Date of Patent: Jun. 25, 2024

(54) ELECTRODE ASSEMBLY, BATTERY CELL, BATTERY, ELECTRICAL APPARATUS, AND MANUFACTURING METHOD AND DEVICE

(71) Applicant: Contemporary Amperex Technology Co., Limited, Ningde (CN)

(72) Inventors: Wenwei Chen, Ningde (CN); Xiaona Wang, Ningde (CN); Zige Zhang, Ningde (CN); Qingrui Xue, Ningde (CN); Chengdu Liang, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 56 days.

(21) Appl. No.: 17/815,216

(22) Filed: Jul. 27, 2022

(65) Prior Publication Data
US 2022/0367985 A1 Nov. 17, 2022

Related U.S. Application Data

(63) Continuation of application No. PCT/CN2020/122245, filed on Oct. 20, 2020.

(51) Int. Cl.
*H01M 50/533* (2021.01)
*H01M 4/38* (2006.01)
(Continued)

(52) U.S. Cl.
CPC ......... *H01M 50/533* (2021.01); *H01M 4/386* (2013.01); *H01M 50/169* (2021.01);
(Continued)

(58) Field of Classification Search
CPC ............. H01M 50/533; H01M 50/169; H01M 50/209; H01M 50/54; H01M 50/566;
(Continued)

(56) References Cited

U.S. PATENT DOCUMENTS

2004/0161669 A1 8/2004 Zolotnik et al.
2015/0017519 A1 1/2015 Cho
(Continued)

FOREIGN PATENT DOCUMENTS

CN 201383529 Y 1/2010
CN 202308207 U 7/2012
(Continued)

OTHER PUBLICATIONS

English Translation of JP2005-149794.*
(Continued)

*Primary Examiner* — Kiran Quraishi Akhtar
(74) *Attorney, Agent, or Firm* — Kilpatrick Townsend & Stockton LLP

(57) ABSTRACT

Embodiments provide an electrode assembly, a battery cell, a battery, an electrical apparatus, and a manufacturing method and device. In those embodiments, the electrode assembly includes: an electrode plate, including a main portion and at least one protruding portion. The main portion includes a metal substrate and an active material layer coated on a surface of the metal substrate. The protruding portion is connected to the metal substrate. The metal substrate protrudes along a length direction of the electrode assembly. Along a thickness direction of the electrode assembly, a size of at least a part of the protruding portion is greater than a size of the metal substrate. The electrode assembly according to the Embodiments aims to solve a technical problem of severe heat emission of a tab.

17 Claims, 11 Drawing Sheets

(51) Int. Cl.
H01M 50/169 (2021.01)
H01M 50/209 (2021.01)
H01M 50/54 (2021.01)
H01M 50/566 (2021.01)

(52) U.S. Cl.
CPC ......... *H01M 50/209* (2021.01); *H01M 50/54* (2021.01); *H01M 50/566* (2021.01); *H01M 2220/20* (2013.01)

(58) Field of Classification Search
CPC ............. H01M 10/0431; H01M 4/386; H01M 50/538; H01M 50/536; H01M 2220/20
See application file for complete search history.

(56) References Cited

U.S. PATENT DOCUMENTS

| | | | | |
|---|---|---|---|---|
| 2020/0006776 | A1* | 1/2020 | Zhou | .................... H01M 4/667 |
| 2020/0212449 | A1 | 7/2020 | Zhang et al. | |
| 2020/0235368 | A1 | 7/2020 | Xue et al. | |

FOREIGN PATENT DOCUMENTS

| | | | | |
|---|---|---|---|---|
| CN | 108428849 | A | 8/2018 | |
| CN | 208507818 | * | 2/2019 | .............. H01M 4/66 |
| CN | 208507818 | U | 2/2019 | |
| CN | 110495018 | A | 11/2019 | |
| CN | 210926141 | U | 7/2020 | |
| CN | 211182349 | U | 8/2020 | |
| CN | 111682156 | A | 9/2020 | |
| JP | 2003223880 | A | 8/2003 | |
| JP | 2005-149794 | * | 6/2005 | ............ H01M 10/05 |
| JP | 2005339939 | A | 12/2005 | |
| JP | 2007335290 | A | 12/2007 | |
| JP | 2012146852 | A | 8/2012 | |
| JP | 2016536770 | A | 11/2016 | |
| KR | 20180105995 | A | 10/2018 | |
| KR | 101978700 | B1 | 5/2019 | |
| WO | 2020073887 | A1 | 4/2020 | |

OTHER PUBLICATIONS

International Search Report and Written Opinion received in PCT Application PCT/CN2020/122245 on Jul. 26, 2021.
EESR issued on Apr. 14, 2023 for the counterpart European application 20958029.9.
Notice of Reasons for Refusal received in the counterpart Japanese application 2022-543114, mailed Aug. 10, 2023.
Notice of Registration received in the counterpart Chinese application 202080095842.3, mailed Oct. 16, 2023.

* cited by examiner

ELECTRODE ASSEMBLY, BATTERY CELL, BATTERY, ELECTRICAL APPARATUS, AND MANUFACTURING METHOD AND DEVICE

CROSS-REFERENCE TO RELATED APPLICATION

This application is a continuation of International Application No. PCT/CN2020/122245, filed Oct. 20, 2020 and entitled "ELECTRODE ASSEMBLY, BATTERY CELL, BATTERY, ELECTRICAL APPARATUS, AND MANUFACTURING METHOD AND DEVICE", the entire content of which is incorporated herein by reference.

TECHNICAL FIELD

The present disclosure relates to the technical field of batteries, and in particular, to an electrode assembly, a battery cell, a battery, an electrical apparatus, and manufacturing method and device.

BACKGROUND

With the development of society as well as science and technology, batteries have been widely used to provide power for high-power apparatuses such as an electric vehicle. A battery includes a plurality of battery cells connected in series or in parallel to achieve a relatively high capacity or power. Each battery cell includes a housing, an electrode assembly, a connector adapter, and electrode terminals. The electrode assembly includes a main portion and a tab. The tab of the electrode assembly is connected to an electrode terminal by the connector adapter. An electrical current may be conducted into or out of the main portion through the electrode terminals, the connector adapter, and the tab. Due to increasingly higher requirements on an energy density of a battery, the size of a battery cell is larger. Therefore, the size of the electrode assembly is larger, and in turn, the size of the main portion is larger. However, the larger size of the main portion leads to severe heat emission of the tab, and affects safety of the battery in use.

SUMMARY

Embodiments provide an electrode assembly, a battery cell, a battery, an electrical apparatus, and manufacturing method and device to solve a technical problem of severe heat emission of a tab.

An embodiment provides an electrode assembly, including: an electrode plate, including a main portion and at least one protruding portion. The main portion includes a metal substrate and an active material layer coated on a surface of the metal substrate. The protruding portion is connected to the metal substrate. The metal substrate protrudes along a length direction of the electrode assembly. Along a thickness direction of the electrode assembly, a size of at least a part of the protruding portion is greater than a size of the metal substrate.

In an embodiment, the protruding portion and the metal substrate are made of a same material and integrally disposed, thereby increasing strength of connection between the protruding portion and the metal substrate, and also improving current-carrying performance between the protruding portion and the metal substrate.

In an embodiment, the protruding portion includes a body portion and a conductive piece. The body portion and the conductive piece are stacked along a thickness direction. An electrical current can be conducted out of or into the electrode assembly through the body portion, the conductive piece, and a connector adapter, thereby effectively improving electrical conduction performance of the electrode assembly and overall current-carrying capacity of the electrode assembly.

In an embodiment, along the thickness direction, the size of the body portion is equal to the size of the metal substrate, thereby facilitating reduction of processing difficulty of the body portion and the metal substrate.

In an embodiment, the body portion, the metal substrate, and the conductive piece are made of the same material.

In an embodiment, the conductive piece and the body portion are made of different materials, and a resistivity of the conductive piece is less than a resistivity of the body portion. Compared with the body portion, the conductive piece with a low resistivity possesses a high current-carrying capacity, thereby helping to further reduce a resistance of the protruding portion and improving the current-carrying capacity of the protruding portion.

In an embodiment, the conductive piece is connected to the body portion. An end that is of the conductive piece and that is away from the active material layer is flush with an end that is of the body portion and that is away from the active material layer. A region that is of the conductive piece and that overlaps the body portion along the thickness direction is configured to electrically connect to an external part. When the protruding portion is electrically connected to the connector adapter, the conductive piece and the body portion can be electrically connected to the connector adapter concurrently.

In an embodiment, the conductive piece includes a first connecting portion and a second connecting portion. The first connecting portion is configured to connect the body portion. The second connecting portion protrudes from an end that is of the body portion and that is away from the active material layer. The second connecting portion is configured to electrically connect to an external part.

The electrode assembly according to this embodiment includes an electrode plate. The electrode plate includes a main portion and a protruding portion. The main portion includes a metal substrate and an active material layer. The protruding portion protrudes from the metal substrate along a length direction of the electrode assembly. The protruding portion is connected to the metal substrate. Along the thickness direction of an electrode body, the size of at least a part of the protruding portion is greater than the size of the metal substrate. Therefore, the protruding portion possesses a relatively large cross-sectional area, so as to achieve a low resistance of the protruding portion. In addition, due to a high heat capacity of the protruding portion, the protruding portion achieves a relatively high current-carrying capacity. In this way, for a strip-shaped electrode assembly of which the size in the length direction is greater than the size in the width direction, the electrode assembly according to this embodiment effectively solves the problem of an insufficient current-carrying capacity of the protruding portion of the strip-shaped electrode assembly, and alleviates excessively rapid temperature rise of the protruding portion during charging or discharging of the electrode assembly. In addition, heat dissipation performance of the protruding portion is improved, thereby reducing a possibility of severe heat emission of the protruding portion. This can effectively improve the charging and discharging efficiency of the battery, and can reduce overheating risks of the battery during charging or discharging and improve safety of battery in use.

In an embodiment, along the thickness direction, a size of the second connecting portion is greater than or equal to a size of the body portion.

In an embodiment, the conductive piece is two in number. The two conductive pieces are connected to two surfaces of the body portion respectively.

The disposition of the two conductive pieces and the body portion further increases the cross-sectional area of the protruding portion, and helps to further reduce the resistance of the protruding portion, so that the protruding portion achieves a relatively high current-carrying capacity.

In an embodiment, along the thickness direction, a sum of sizes of the second connecting portions of the two conductive pieces is greater than or equal to a size of the body portion.

In this way, the cross-sectional area of the second connecting portions of the two conductive pieces configured to electrically connect to the connector adapter is greater than or equal to the cross-sectional area of the body portion, thereby effectively ensuring a relatively high current-carrying capacity of the second connecting portions of the two conductive pieces.

In an embodiment, the body portion is welded to the conductive pieces.

In an embodiment, a protection layer is disposed at a root portion that is of the body portion and that is proximate to the active material layer. A weld region between the conductive piece and the body portion is spaced apart from the protection layer.

The protection layer disposed at the root of the body portion can exert a protective effect and reduce the possibility that the body portion is bent and pressed into a position between two adjacent electrode plates.

In an embodiment, the body portion includes a fuse portion.

The fuse portion disposed at the body portion can be disposed proximate to the heat emission region, thereby helping to shorten the time of heat transfer to the fuse portion and ensure timely blowing of the fuse portion, so as to cut off the electrical connection between the protruding portion and the connector adapter and ensure the safety of the battery.

In an embodiment, the electrode assembly includes at least two electrode plates. The at least two electrode plates are stacked along the thickness direction.

In an embodiment, a size of the protruding portion along a width direction of the electrode assembly is L1. A size of each of the electrode plates along the width direction of the main portion is L2. L1 and L2 satisfy: $1/3 \times L2 \leq L1 \leq 3/4 \times L2$.

In an embodiment, the size L1 of the protruding portion along the width direction is 15 mm to 60 mm.

In an embodiment, a size of each of the electrode plates along the length direction of the electrode assembly is L3. A size of each of the electrode plates along a width direction of the electrode assembly is L2. L3 and L2 satisfy: a ratio of L3 to L2 ranges from 4 to 20.

In an embodiment, a sum of capacity of the active material layer on two surfaces of the metal substrate is C and is greater than 3 Ah but less than 10 Ah.

An embodiment further provides a battery cell, including the electrode assembly according to the foregoing embodiment.

An embodiment further provides a battery, including the battery cell according to the foregoing embodiment.

An embodiment further provides an electrical apparatus, including the battery according to the foregoing embodiment. The battery is configured to provide electrical energy.

An embodiment further provides a method for manufacturing an electrode assembly, including:
providing a first sheet of material, where the first sheet of material includes a first part and a second part;
a coating step, that is, coating a surface of the first part with an active material layer;
providing a second sheet of material, and connecting the second sheet of material to the second part;
a material removing step, that is, removing a part of material from the second sheet of material and the second part to form an electrode plate that includes a main portion and at least one protruding portion, where the main portion includes the active material layer and a metal substrate corresponding to the active material layer, a thickness of at least a part of the protruding portion connected to the metal substrate is greater than a thickness of the metal substrate, the protruding portion includes a body portion and a conductive piece connected to the body portion, a remainder of the second part forms the body portion, and a remainder of the second sheet of material forms the conductive piece; and
a forming step, that is, winding or stacking the electrode plate to form an electrode assembly, where the protruding portion protrudes from the metal substrate along a length direction of the electrode assembly.

An embodiment further provides a device for manufacturing an electrode assembly, including:
a first material processing apparatus, configured to provide a first sheet of material, where the first sheet of material includes a first part and a second part;
a coating apparatus, configured to coat a surface of the first part with an active material layer;
a second material processing apparatus, configured to provide a second sheet of material, and connect the second sheet of material to the second part;
a material removing apparatus, configured to remove a part of material from the second sheet of material and the second part to form an electrode plate that includes a main portion and at least one protruding portion, where the main portion includes the active material layer and a metal substrate corresponding to the active material layer, a thickness of at least a part of the protruding portion connected to the metal substrate is greater than a thickness of the metal substrate, the protruding portion includes a body portion and a conductive piece connected to the body portion, a remainder of the second part forms the body portion, and a remainder of the second sheet of material forms the conductive piece; and
a forming apparatus, configured to wind or stack the electrode plate to form an electrode assembly, where the protruding portion protrudes from the metal substrate along a length direction of the electrode assembly.

BRIEF DESCRIPTION OF DRAWINGS

For illustrating various embodiments, drawings are provided and described briefly below. The drawings herein are merely for illustrating embodiments. A person of ordinary skill in the art may derive other drawings from achieving other embodiments in accordance with the present disclosure.

Figure 1:
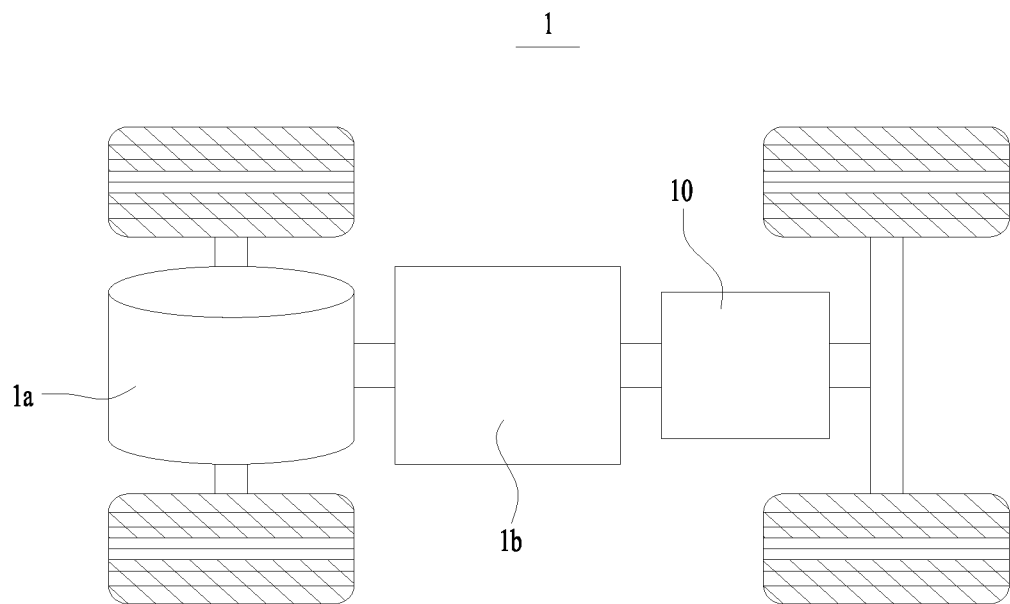
FIG. 1 is a schematic structural diagram of a vehicle according to an embodiment.

The drawings are not drawn to scale.

REFERENCE NUMERALS 1. vehicle; 1a. motor; 1b. controller; 10. battery; 11. first shell; 12. second shell; 20. battery module; 30. battery cell; 31. housing; 32. electrode assembly; 32a. electrode body; 321. electrode plate; 3211. main portion; 3211a. metal substrate; 3211b. active material layer; 3212. protruding portion; 32121. body portion; 32121a. fuse portion; 32121b. partitioning groove; 32122. conductive piece; 32122a. first connecting portion; 32122b. second connecting portion; 322. separator; 323. protection layer; 33. end cap; 34. electrode terminal; 35. connector adapter; 40. first sheet of material; 41. first part; 42. second part; 50. second sheet of material; 100. manufacturing device; 101. first material processing apparatus; 102. coating apparatus; 103. second material processing apparatus; 104. material removing apparatus; 105. forming apparatus; X. length direction; Y. width direction; Z. thickness direction.

DETAILED DESCRIPTION OF EMBODIMENTS

The following gives a more detailed description of implementations of this application with reference to drawings and embodiments. The detailed description of the following embodiments and the accompanying drawings are intended to exemplarily describe the principles of this application, but not to limit the scope of this application. Therefore, this application is not limited to the described embodiments.

In the description of this application, unless otherwise specified, "a plurality of" means at least two in number; the terms such as "upper", "lower", "left", "right", "inner", and "outer" indicating a direction or a position relationship are merely intended for ease or brevity of description of this application, but do not indicate or imply that the mentioned apparatus or component is necessarily located in the specified direction or constructed or operated in the specified direction. Therefore, such terms are not to be understood as a limitation on this application. In addition, the terms "first", "second", and "third" are merely intended for descriptive purposes, but are not intended to indicate or imply relative importance. "Perpendicular" is not exactly perpendicular, but within an error tolerance range. "Parallel" is not exactly parallel, but within an error tolerance range.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

After finding the problem of severe heat emission of a tab, the inventor(s) carries out research and analysis on a battery cell. The inventor(s) finds that, due to increasingly higher requirements on an energy density of a battery, considering that a structure of a battery cell needs to meet requirements on a space occupancy rate, the structure of the battery cell needs to be made into a strip-shaped flat structure, so that an electrode body of an electrode assembly is elongated into a strip-shaped flat structure. The tab extends from an end face of the electrode body. However, the tab extending from the end face of the electrode body incurs a problem of an insufficient current-carrying capacity, thereby leading to the problem of severe heat emission of the tab.

Based on the foregoing problem found by the inventor(s), the inventor(s) improves the structure of the battery cell. Embodiments are described below.

For a better understanding, the following describes various embodiments with reference to FIG. 1 to FIG. 17.

An embodiment provides an electrical apparatus that uses a battery 10 as a power supply. The electrical apparatus may be, but is not limited to, a vehicle, a ship, or an aircraft. Referring to FIG. 1, an embodiment provides a vehicle 1. The vehicle 1 may be an oil-fueled vehicle, a natural gas vehicle, or a new energy vehicle. The new energy vehicle may be a battery electric vehicle, a hybrid electric vehicle, or a range-extended electric vehicle, or the like. In an embodiment, the vehicle 1 may include a motor 1a, a controller 1b, and a battery 10. The controller 1b is configured to control the battery 10 to supply power to the motor 1a. The motor 1a is connected to wheels of the vehicle 1 through a transmission mechanism to drive the vehicle 1 to run. The battery 10 may be used as a drive power supply of the vehicle 1, and provide driving motive power for the vehicle 1 in place of or partially in place of oil or natural gas. In an example, the battery 10 may be disposed at the bottom, front, or rear of the vehicle 1. The battery 10 may be configured to electrically power the vehicle 1. In an example, the battery 10 may serve as an operating power supply of the vehicle 1 to power a circuit system of the vehicle 1. In an example, the battery 10 may be configured to meet operating power usage requirements of the vehicle 1 that is being started, navigated, or running.

Figure 2:
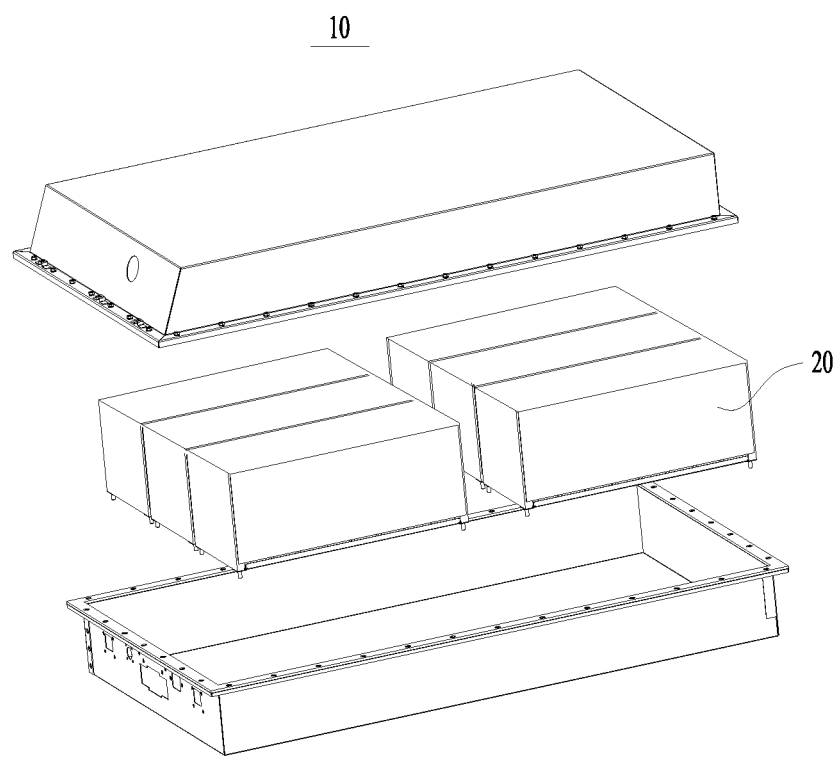
FIG. 2 is a schematic structural exploded view of a battery pack according to an embodiment.

Referring to FIG. 2, the battery 10 may include at least two battery modules 20. In some optional embodiments, the battery 10 further includes a box. The battery modules 20 are disposed in the box. The at least two battery modules 20 are arranged in the box. The type of the box is not limited. The box may be in a frame shape, a disk shape, a cassette shape, or the like. In an example, the box includes a first shell 11 configured to accommodate the battery modules 20, and a second shell 12 configured to fit the first shell 11. The first shell 11 fits the second shell 12 to form an accommodation portion configured to accommodate the battery modules 20.

Figure 3:
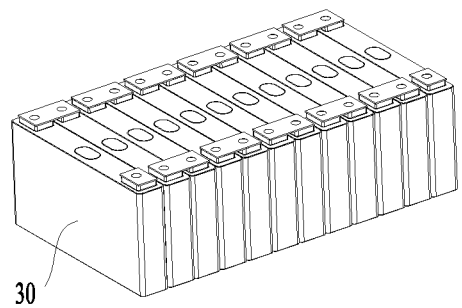
FIG. 3 is a partial schematic structural diagram of a battery module according to an embodiment.

To meet different power usage requirements, each of the battery modules 20 may include one or more battery cells 30. Referring to FIG. 3, a plurality of battery cells 30 may be connected in series, in parallel, or in both series and in parallel to form a battery module, and then a plurality of battery modules 20 may be connected in series, in parallel, or in both series and parallel to form a battery. The connecting in both series and parallel means a combination of series connection and parallel connection. In an example, the battery may include a plurality of battery cells 30. The plurality of battery cells 30 may be connected in series, in parallel, or in both series and parallel. The plurality of battery cells 30 may be directly disposed in the box. In other words, the plurality of battery cells 30 may directly form the battery 10, or form the battery modules 20 that are then used to form the battery 10. The battery cells 30 include, but are not limited to, a lithium-ion secondary battery, a lithium-ion primary battery, a lithium-sulfur battery, a sodium-lithium-ion battery, or a magnesium-ion battery.

When a battery cell 30 according to this embodiment is applied to the vehicle 1, a width of the battery cell 30 is the same as the height of the vehicle 1. As limited by space in a height direction of the vehicle 1, the width of the battery cell 30 is also strictly limited. Therefore, when a capacity of the battery cell 30 needs to be increased, the increase of the width of the battery cell 30 is not unlimited, and the length of the battery cell 30 can be increased.

Figure 4:
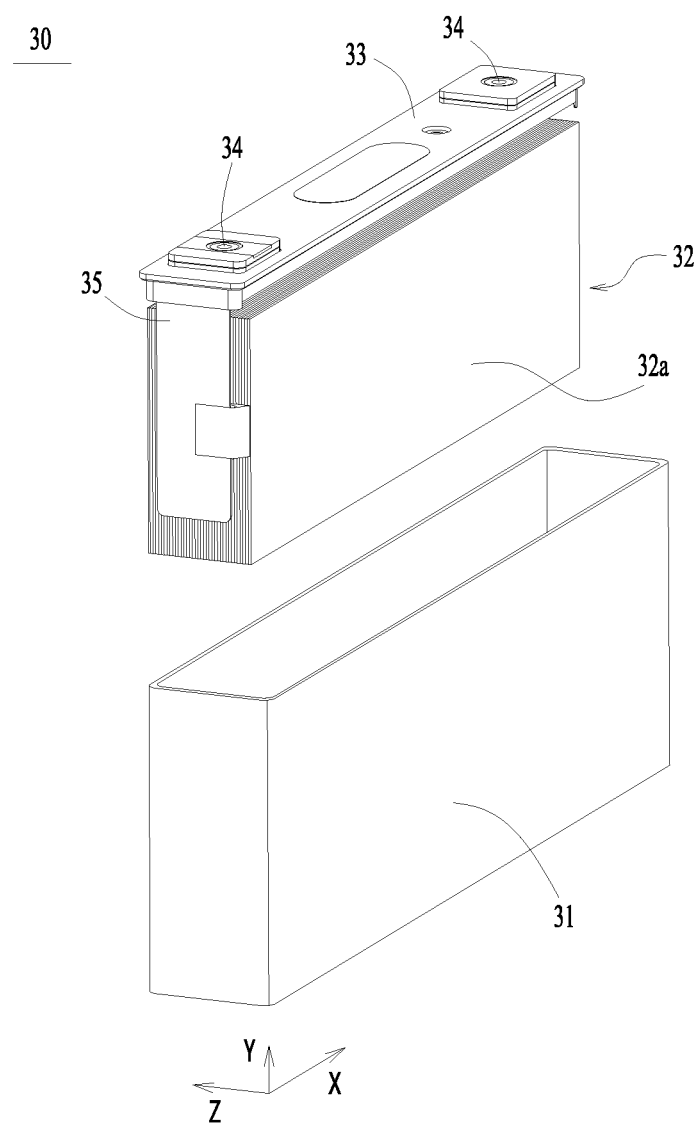
FIG. 4 is a schematic structural exploded view of a battery cell according to an embodiment.

Referring to FIG. 4, the battery cell 30 according to an embodiment includes a housing 31 and an electrode assembly 32 disposed in the housing 31. The housing 31 in this embodiment is a rectangular structure or another shape. The housing 31 includes an internal space for accommodating the electrode assembly 32 and an electrolytic solution, and an opening that is in communication with the internal space. The housing 31 may be made of a material such as aluminum, aluminum alloy, or plastic. The electrode assembly 32 is a core member for the battery cell 30 to implement functions of charging and discharging.

The battery cell 30 according to this embodiment further includes an end cap 33, electrode terminals 34, and a connector adapter 35. The end cap 33 is connected to the housing 31 to seal the opening of the housing 31. In an example, the end cap 33 may be connected to the housing 31 by welding. The electrode terminals 34 are disposed on the end cap 33. The shape of the electrode terminals 34 may be circular or rectangular, without being limited herein. An electrode terminal 34 is electrically connected to the electrode assembly 32 by the connector adapter 35. At least two battery cells 30 may be connected in series, in parallel, or in both series and parallel by their respective electrode terminals 34.

The electrode assembly 32 according to this embodiment includes an electrode body 32a. The electrode assembly 32 possesses a length, a width and a thickness that are preset. Here, the length means the size of the electrode body 32a along a length direction X of the electrode body, the width means the size of the electrode body 32a along a width direction Y of the electrode body, and the thickness means the size of the electrode body 32a along a thickness direction Z of the electrode body. The length direction X, the width direction Y, and the thickness direction Z are perpendicular to each other.

Figure 5:
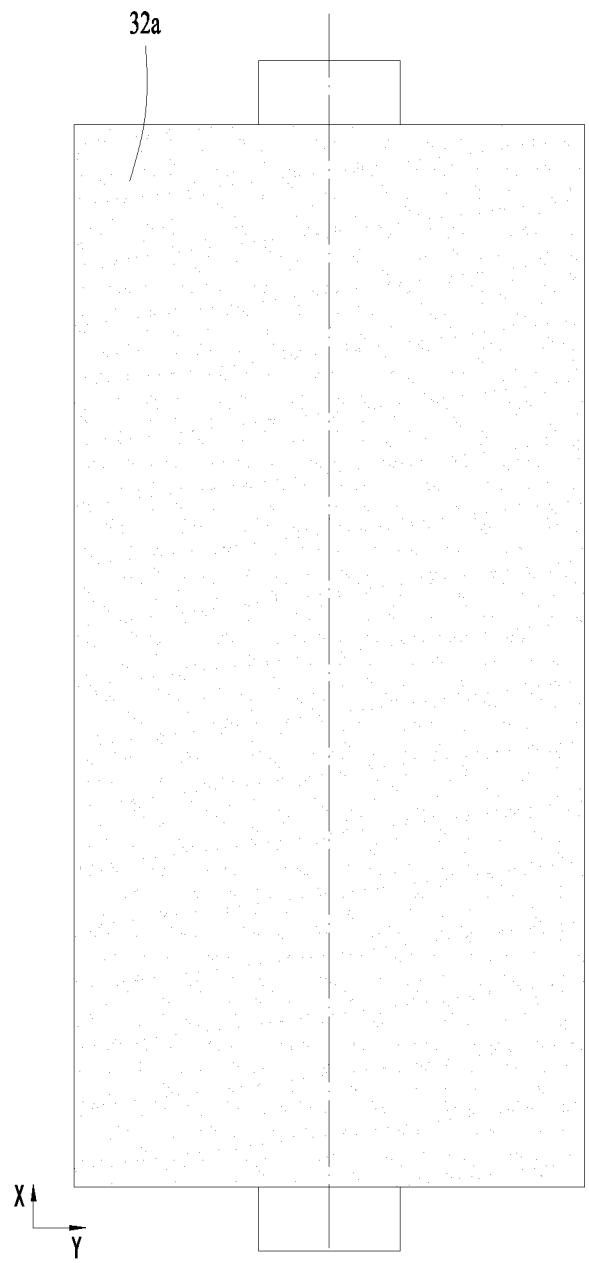
FIG. 5 is a top-view schematic structural diagram of an electrode assembly according to an embodiment.
Figure 6:
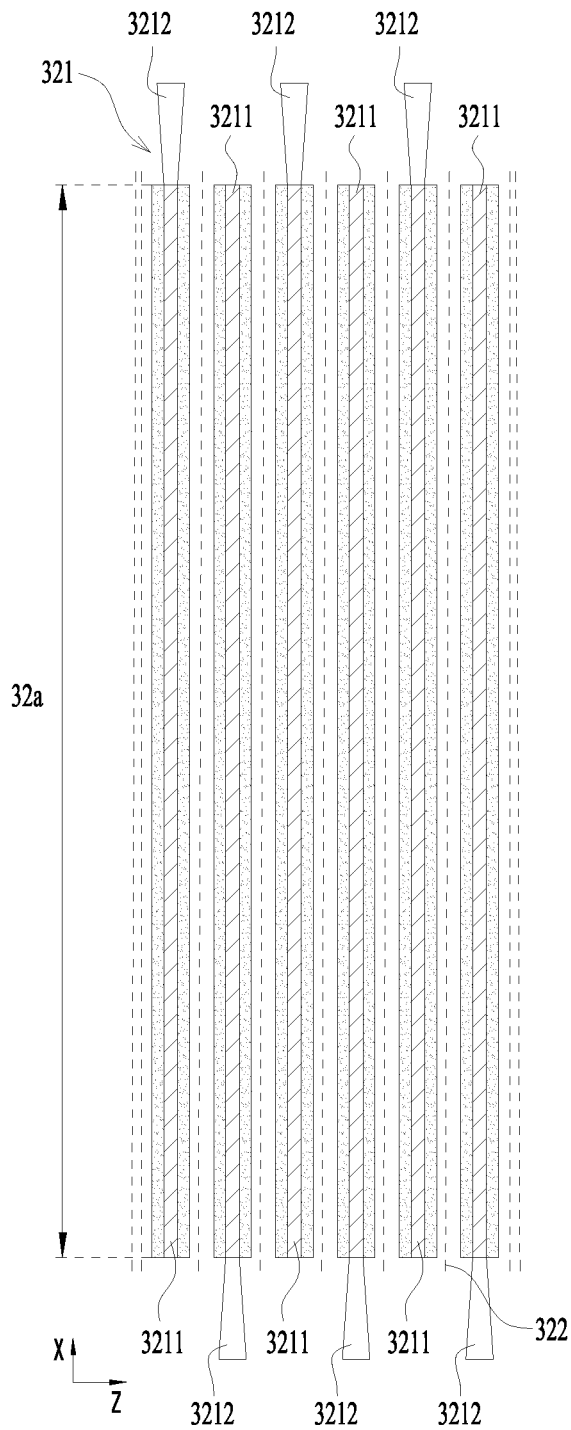
FIG. 6 is a side-view schematic structural diagram of an electrode assembly according to an embodiment.

Referring to FIG. 4 to FIG. 6, the electrode body 32a according to this embodiment may include an electrode plate 321. In an example, the electrode plate 321 may be a positive electrode plate. In this case, the electrode body 32a may include one or more positive electrode plates. In an example, the electrode plate 321 may be a negative electrode plate. In this case, the electrode body 32a may include one or more negative electrode plates. When the electrode body 32a includes a positive electrode plate and a negative electrode plate, the positive electrode plate and the negative electrode plate may be stacked along the thickness direction Z, so that the formed electrode assembly 32 is a stacked structure. Alternatively, the positive electrode plate and the negative electrode plate may be wound to form the electrode assembly 32. Two adjacent electrode plates 321 are of opposite polarities. Therefore, the two adjacent electrode plates 321 may be separated by a separator 322. The separator 322 is an insulator located between the two electrode plates 321 of opposite polarities.

Figure 7:
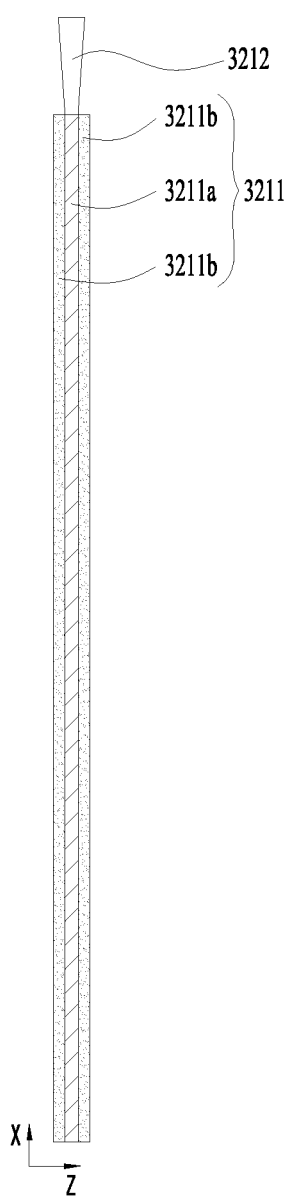
FIG. 7 is a partial side-view schematic structural diagram of an electrode assembly according to an embodiment.

Referring to FIG. 6 and FIG. 7, each electrode plate 321 according to this embodiment includes a main portion 3211 and at least one protruding portion 3212. The protruding portion 3212 protrudes from the main portion 3211 along the length direction X of the electrode body 32a. In an embodiment in which the electrode plates 321 are stacked, the protruding portions 3212 of a same polarity may be stacked along the thickness direction Z. The main portions 3211 are stacked along the thickness direction Z to form the electrode body 32a. The connector adapter 35 is electrically connected to the protruding portion 3212. In an example, the connector adapter 35 is welded to the protruding portion 3212 by means of laser welding or ultrasonic welding, for example.

The main portion 3211 includes a metal substrate 3211a and an active material layer 3211b. At least a part of a surface of the metal substrate 3211a is coated with the active material layer 3211b. That is, the surface of the metal substrate 3211a may be fully or partly overlaid with the active material layer 3211b. In an example, when the metal substrate 3211a is an aluminum foil, the active material layer 3211b may include a ternary material, lithium manganese oxide, or lithium iron phosphate. When the metal substrate 3211a is a copper foil, the active material layer 3211b may include graphite or silicon. The protruding portion 3212 is connected to the metal substrate 3211a, and the protruding portion 3212 protrudes from the metal substrate 3211a along the length direction X of the electrode body 32a. Along the thickness direction Z of the electrode body 32a, the size of at least a part of the protruding portion 3212 is greater than the size of the metal substrate 3211a, thereby increasing the cross-sectional area of the protruding portion 3212, helping to reduce the resistance of the protruding portion 3212 and increase an overall heat capacity of the protruding portion 3212, and in turn, improving the current-carrying capacity of the protruding portion 3212. The heat capacity means the amount of heat necessary to raise the temperature of a given material by 1 degree.

The electrode assembly 32 according to this embodiment includes at least one electrode plate 321. The electrode plate 321 includes a main portion 3211 and a protruding portion 3212. The main portion 3211 includes a metal substrate 3211a and an active material layer 3211b. The protruding portion 3212 protrudes from the metal substrate 3211a along the length direction X of the electrode assembly 32. The protruding portion 3212 is connected to the metal substrate 3211a. Along the thickness direction Z of the electrode body 32a, the size of at least a part of the protruding portion 3212 is greater than the size of the metal substrate 3211a. Therefore, the protruding portion 3212 possesses a relatively large cross-sectional area, so as to achieve a low resistance of the protruding portion 3212. In addition, due to a high heat capacity of the protruding portion 3212, the protruding portion 3212 achieves a relatively high current-carrying capacity. In this way, for a strip-shaped electrode assembly 32 of which the size in the length direction X is greater than the size in the width direction Y, the electrode assembly 32 according to this embodiment effectively solves the problem of an insufficient current-carrying capacity of the protruding portion 3212 of the strip-shaped electrode assembly 32, and alleviates excessively rapid temperature rise of the protruding portion 3212 during charging or discharging of the electrode assembly 32. In addition, heat dissipation performance of the protruding portion 3212 is improved, thereby reducing a possibility of severe heat emission of the protruding portion 3212. This can effectively improve the charging and discharging efficiency of the battery, and can reduce overheating risks of the battery during charging or discharging and improve safety of battery in use.

In some embodiments, along the thickness direction Z of the electrode body 32a, an active material layer 3211b may be applied onto two opposite surfaces of the metal substrate 3211a. In an example, the metal substrate 3211a is a whole sheet of material. That is, the metal substrate 3211a is an integrally formed structure.

Figure 8:
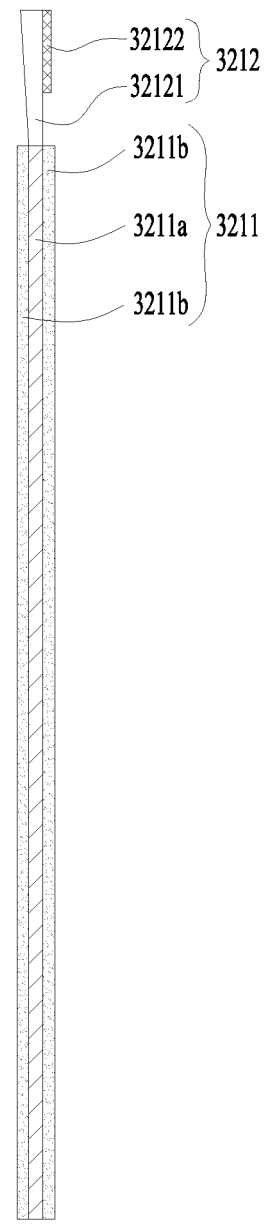
FIG. 8 is a partial side-view schematic structural diagram of an electrode assembly according to another embodiment.

In some embodiments, referring to FIG. 8, the protruding portion 3212 includes a body portion 32121 and a conductive piece 32122. The connector adapter 35 may be electrically connected to the body portion 32121 of the protruding portion 3212. The body portion 32121 and the metal substrate 3211a are made of a same material and are integrally disposed. In an example, both the material of the metal substrate 3211a and the material of the body portion 32121 are aluminum or copper. That the body portion 32121 and the metal substrate 3211a are made of the same material and integrally disposed can increase strength of connection between the body portion 32121 and the metal substrate 3211a, and also improve current-carrying performance between the body portion 32121 and the metal substrate 3211a.

In some optional embodiments, along the thickness direction Z of the electrode body 32a, the size of at least a part of the body portion 32121 is greater than the size of the metal substrate 3211a. That is, the size of the entirety or a part of the body portion 32121 is greater than the size of the metal substrate 3211a. Therefore, the body portion 32121 possesses a relatively large cross-sectional area, thereby helping to reduce the resistance of the body portion. In this way, the body portion 32121 achieves a relatively high current-carrying capacity.

In some embodiments, along the thickness direction Z of the electrode body 32a, the conductive piece 32122 and the body portion 32121 are stacked. In an example, at least a part of the conductive piece 32122 may be connected to the body portion 32121 by welding, for example, by means of laser welding or ultrasonic welding. The connector adapter 35 may be electrically connected to the protruding portion 3212. An electrical current can be conducted out of or into the electrode assembly 32 through the body portion 32121, the conductive piece 32122, and the connector adapter 35, thereby effectively improving electrical conduction performance of the electrode assembly 32 and overall current-carrying capacity of the electrode assembly 32. In an example, the conductive piece 32122 may be a sheet structure.

In some optional embodiments, along the thickness direction Z of the electrode body 32a, a sum of the size of the conductive piece 32122 and the size of the body portion 32121 is greater than the size of the metal substrate 3211a. Therefore, the protruding portion 3212 possesses a relatively large cross-sectional area, thereby helping to further reduce the resistance of the protruding portion 3212. In this way, the protruding portion 3212 achieves a relatively high current-carrying capacity.

In some optional embodiments, along the thickness direction Z of the electrode body 32a, the size of the body portion 32121 is equal to the size of the metal substrate 3211a. That is, the size of the entirety of the body portion 32121 is equal to the size of the metal substrate 3211a. Along the thickness direction Z of the electrode body 32a, the surface of the body portion 32121 may keep flush with the surface of the metal substrate 3211a. In a processing and manufacturing process in which the body portion 32121 and the metal substrate 3211a are integrally formed, the thickness of the body portion 32121 is the same as the thickness of the metal substrate 3211a, thereby reducing the processing difficulty of the body portion 32121 and the metal substrate 3211a, and in turn, reducing the processing cost. In an example, along the thickness direction Z of the electrode body 32a, the size of the conductive piece 32122 is less than or equal to the size of the metal substrate 3211a, but the sum of the size of the conductive piece 32122 and the size of the body portion 32121 is greater than the size of the metal substrate 3211a.

In some embodiments, the body portion 32121, the metal substrate 3211a, and the conductive piece 32122 are made of the same material. The body portion 32121, the metal substrate 3211a, and the conductive piece 32122 are of equal resistivity. In an example, the body portion 32121, the metal substrate 3211a, and the conductive piece 32122 may be made of an aluminum material or a copper material.

When the electrode plate 321 is a positive electrode plate, the body portion 32121, the metal substrate 3211a, and the conductive piece 32122 may be made of an aluminum material. When the electrode plate 321 is a negative electrode plate, the body portion 32121, the metal substrate 3211a, and the conductive piece 32122 may be made of a copper material.

In some embodiments, the conductive piece 32122 and the body portion 32121 are made of different materials, and the resistivity of the conductive piece 32122 is less than the resistivity of the body portion 32121. The resistivity is a physical quantity used for denoting resistance characteristics of various substances. The resistance of a conductor that is 1 meter in length and 1 square meter in cross-sectional area and that is made of a given material is numerically equal to the resistivity of this material. Compared with the body portion 32121, the conductive piece 32122 with a low resistivity possesses a high current-carrying capacity, thereby helping to further reduce the resistance of the protruding portion 3212 and improving the current-carrying capacity of the protruding portion 3212. For example, the conductive piece 32122 is made of a copper material, and the body portion 32121 is made of an aluminum material.

In some embodiments, the conductive piece 32122 is connected to the body portion 32121. An end that is of the conductive piece 32122 and that is away from the active material layer 3211b is flush with an end that is of the body portion 32121 and that is away from the active material layer 3211b. A region that is of the conductive piece 32122 and that overlaps the body portion 32121 along the thickness direction Z is configured to electrically connect to an external part. In this embodiment, the region that is of the conductive piece 32122 and that overlaps the body portion 32121 along the thickness direction Z is configured to electrically connect to a connector adapter 35. When the protruding portion 3212 is electrically connected to the connector adapter 35, the conductive piece 32122 and the body portion 32121 can be electrically connected to the connector adapter 35 concurrently. In an example, the conductive piece 32122 and the body portion 32121 are welded to the connector adapter 35 concurrently.

Figure 9:
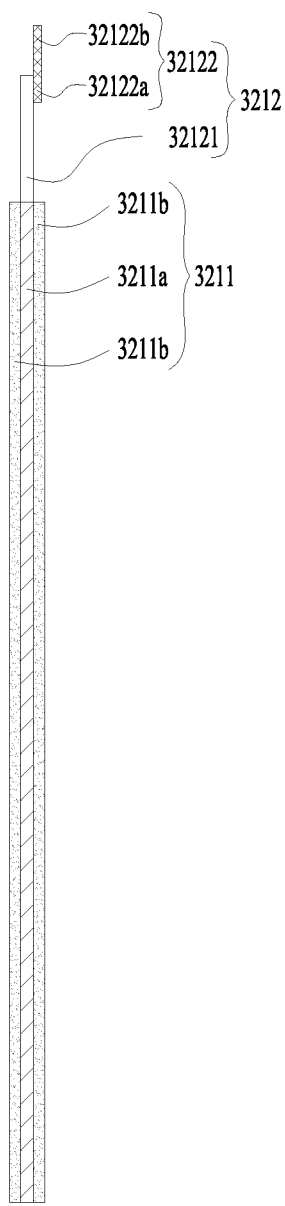
FIG. 9 is a partial side-view schematic structural diagram of an electrode assembly according to still another embodiment.

In some embodiments, referring to FIG. 9, the conductive piece 32122 includes a first connecting portion 32122a and a second connecting portion 32122b. The first connecting portion 32122a is configured to connect the body portion 32121. In an example, the first connecting portion 32122a is connected to the body portion 32121 by welding. The second connecting portion 32122b protrudes from the end that is of the body portion 32121 and that is away from the active material layer 3211b. The second connecting portion 32122b is configured to electrically connect to an external part. In this embodiment, the second connecting portion 32122b is configured to electrically connect to the connector adapter 35. The electrical connection between the second connecting portion 32122b and the adapter member 35 helps to reduce a stacking thickness of a connection region between the second connecting portion 32122b and the connector adapter 35. In this way, when the second connecting portion 32122b is connected to the connector adapter 35 by welding, the electrical connection helps to reduce the difficulty of welding and reduce the possibility of a rosin joint caused between the second connecting portion 32122b and the connector adapter 35 by poor welding, where the rosin joint adversely affects the current-carrying capacity between the second connecting portion 32122b and the connector adapter 35.

In some optional embodiments, along the thickness direction Z of the electrode body 32a, the size of the second connecting portion 32122b is greater than or equal to the size of the body portion 32121. For example, the sum of the size of the second connecting portion 32122b and the size of the body portion 32121 is greater than the size of the metal substrate 3211a.

Figure 10:
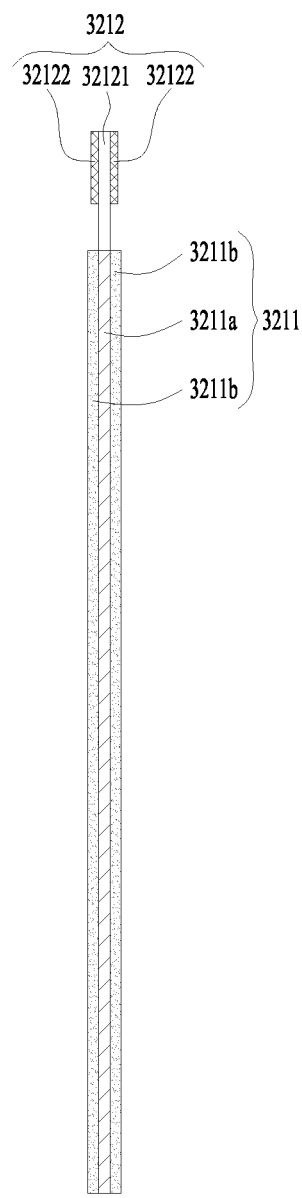
FIG. 10 is a partial side-view schematic structural diagram of an electrode assembly according to still another embodiment.

In some embodiments, referring to FIG. 10, the conductive piece 32122 is two in number. Along the thickness direction Z of the electrode body 32a, the two conductive pieces 32122 are connected to two surfaces of the body portion 32121 respectively. One surface of the body portion 32121 is connected to one conductive piece 32122. The disposition of the two conductive pieces 32122 and the body portion 32121 further increases the cross-sectional area of the protruding portion 3212 and helps to further reduce the resistance of the protruding portion 3212, so that the protruding portion 3212 achieves a relatively high current-carrying capacity.

In some optional embodiments, referring to FIG. 10, the end that is of each conductive piece 32122 among the two conductive pieces 32122 and that is away from the active material layer 3211b is flush with the end that is of the body portion 32121 and that is away from the active material layer 3211b. A region that is of the two conductive pieces 32122 and that overlaps the body portion 32121 along the thickness direction Z is configured to electrically connect to an external part. In this embodiment, the region that is of the two conductive pieces 32122 and that overlaps the body portion 32121 along the thickness direction Z is configured to electrically connect to a connector adapter 35. When the protruding portion 3212 is electrically connected to the connector adapter 35, the two conductive pieces 32122 and the body portion 32121 can be electrically connected to the connector adapter 35 concurrently.

Figure 11:
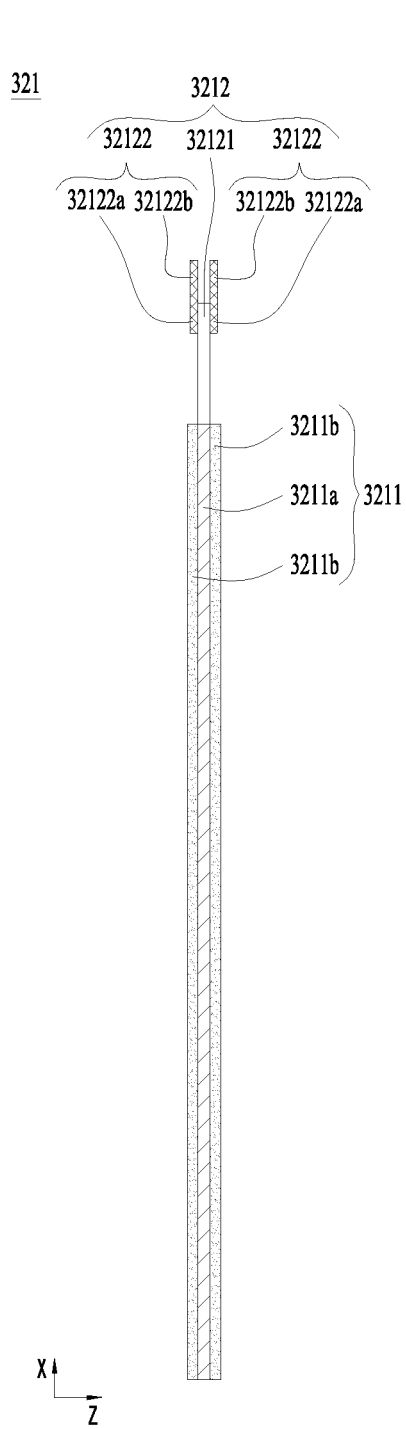
FIG. 11 is a partial side-view schematic structural diagram of an electrode assembly according to still another embodiment.

In some optional embodiments, referring to FIG. 11, each of the two conductive pieces 32122 includes a first connecting portion 32122a and a second connecting portion 32122b. The first connecting portion 32122a of each conductive piece 32122 is configured to connect the body portion 32121. The second connecting portion 32122b of each conductive piece 32122 protrudes from the end that is of the body portion 32121 and that is away from the active material layer 3211b. In addition, the second connecting portion 32122b of each conductive piece 32122 is configured to electrically connect to an external part. In this embodiment, the second connecting portion 32122b of each conductive piece 32122 is configured to electrically connect to the connector adapter 35.

In some optional embodiments, the sum of the sizes of the second connecting portions 32122b of the two conductive pieces 32122 along the thickness direction Z is greater than or equal to the size of the body portion 32121 along the thickness direction Z. In this way, the cross-sectional area of the second connecting portions 32122b of the two conductive pieces 32122 configured to electrically connect to the connector adapter 35 is greater than or equal to the cross-sectional area of the body portion 32121, thereby effectively ensuring a relatively high current-carrying capacity of the second connecting portions 32122b of the two conductive pieces 32122, reducing the possibility that the second connecting portions 32122b of the two conductive pieces 32122 become portions of a low current-carrying capacity, and in turn, ensuring a high current-carrying capacity of the entire protruding portion 3212.

Figure 12:
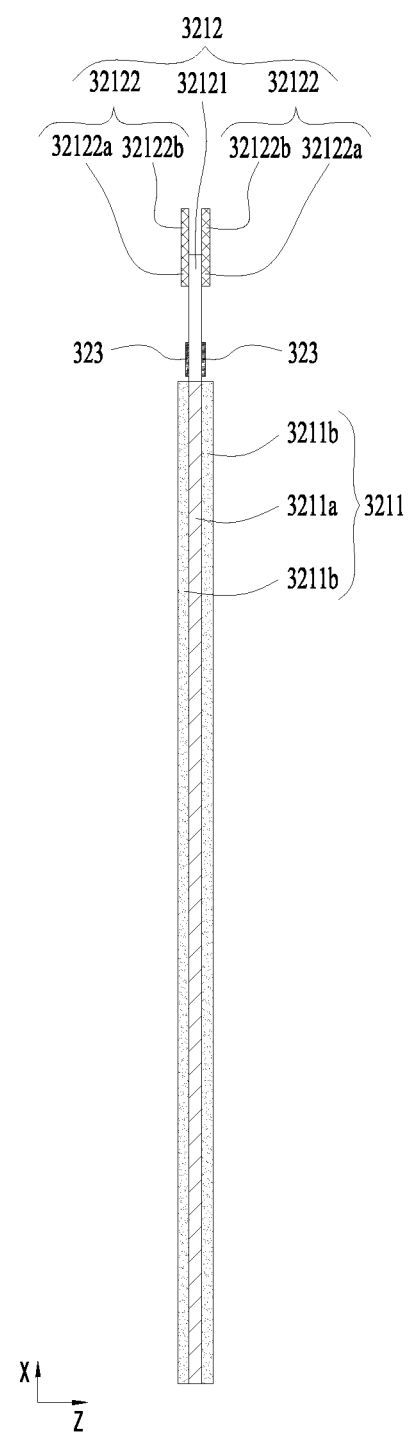
FIG. 12 is a partial side-view schematic structural diagram of an electrode assembly according to yet another embodiment.

In some embodiments, referring to FIG. 12, a protection layer 323 is disposed at a root portion that is of the body portion 32121 and that is proximate to the active material layer 3211b. The conductive piece 32122 may be connected to the body portion 32121 by welding. A weld region between the conductive piece 32122 and the body portion 32121 is spaced apart from the protection layer 323. During assembling of the battery cell 30, due to a relatively small thickness of the body portion 32121, the body portion 32121 under a force is prone to bend and deform and be pressed into a position between two adjacent electrode plates 321 to result in short-circuit risks. The root region of the body portion 32121 is at the highest risk of bending and deformation. Therefore, the protection layer 323 disposed at the root portion of the body portion 32121 can serve a protective purpose. Even if the body portion 32121 is bent and pressed into a position between two adjacent electrode plates 321, the protection layer 323 can still effectively separate the two electrode plates 321 to reduce short-circuit risks and improve safety of the battery. In an example, the material of the protection layer 323 may be an insulative material such as one or more of aluminum oxide, magnesium oxide, titanium dioxide, zirconium oxide, silicon dioxide, silicon carbide, boron carbide, calcium carbonate, aluminum silicate, calcium silicate, potassium titanate, or barium sulfate. The protection layer 323 may be bonded to the body portion 32121 by using a binder. The binder includes one or more of polyvinylidene difluoride, polyacrylonitrile, polyacrylic acid, polyacrylate, polyacrylic acid-acrylate, polyacrylonitrile-acrylic acid, or polyacrylonitrile-acrylate. The protection layer 323 may be an active material layer 3211b instead. In coating the metal substrate 3211a of an electrode plate 321 with the active material layer 3211b, the root portion of the body portion 32121 may be coated with the active material layer 3211b concurrently to form the protection layer 323.

Figure 13:
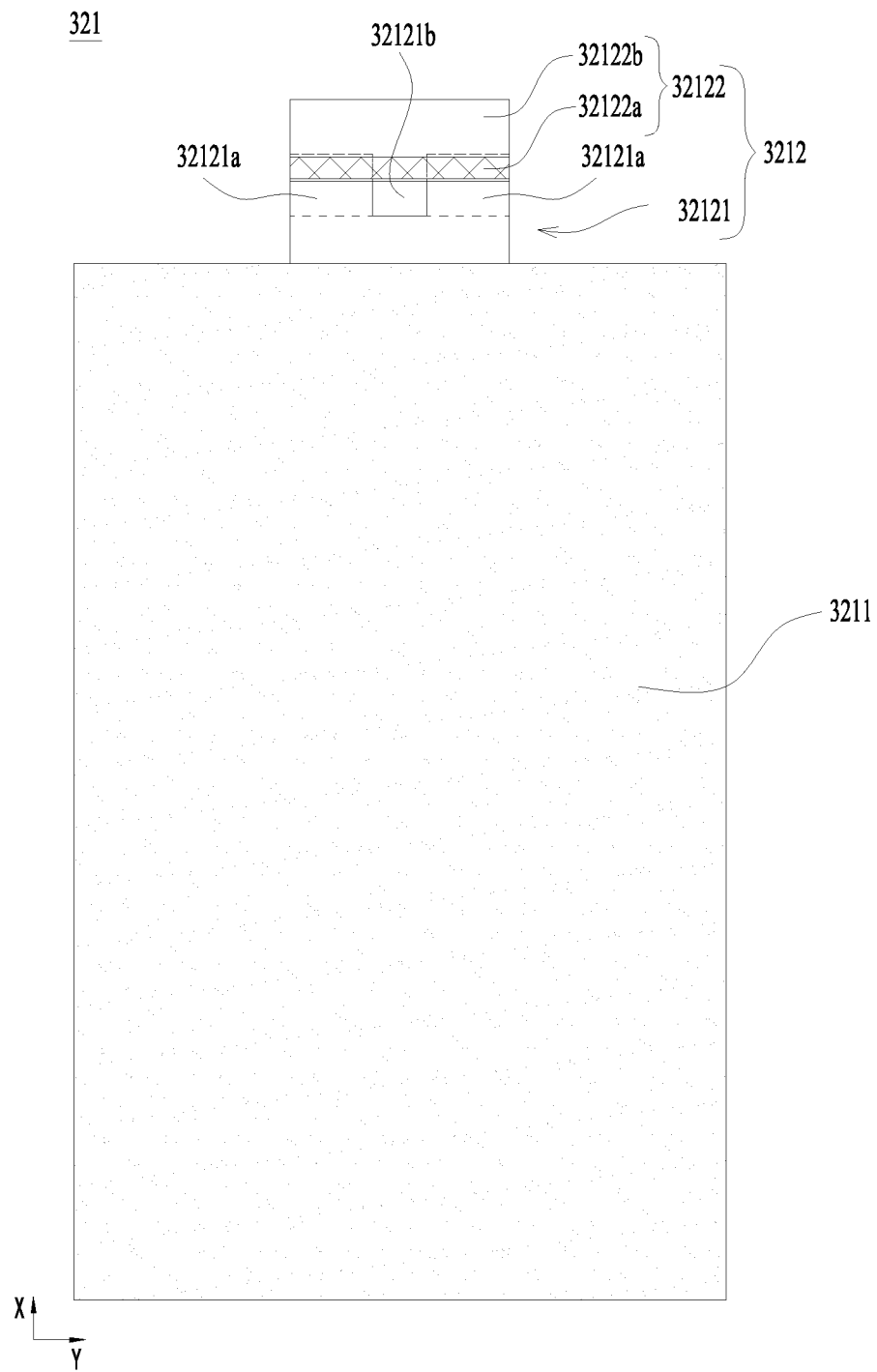
FIG. 13 is a partial top-view schematic structural diagram of an electrode assembly according to an embodiment.

In some embodiments, referring to FIG. 13, the body portion 32121 includes a fuse portion 32121a. The conductive piece 32122 is connected to the fuse portion 32121a of the body portion 32121 by welding. In a case that a fuse structure is disposed on the connector adapter 35, because the fuse structure is far away from a heat emission region, the heat transfer to the fuse structure is delayed. Therefore, the fuse structure is not easily blown in time, thereby adversely affecting the safety of the battery. Compared with the fuse structure disposed on the connector adapter 35, the fuse portion 32121a disposed at the body portion 32121 can be proximate to the heat emission region, thereby helping to shorten the time of heat transfer to the fuse portion 32121a and ensure timely blowing of the fuse portion 32121a, so as to cut off the electrical connection between the protruding portion 3212 and the connector adapter 35 and ensure the safety of the battery.

In some optional embodiments, referring to FIG. 13, the end that is of the body portion 32121 and that is away from the electrode plate 321 includes a partitioning groove 32121b. The partitioning groove 32121b partitions the end of the body portion 32121 so that the end forms a plurality of fuse portions 32121a. There is a partitioning groove 32121b between two adjacent fuse portions 32121a.

Figure 14:
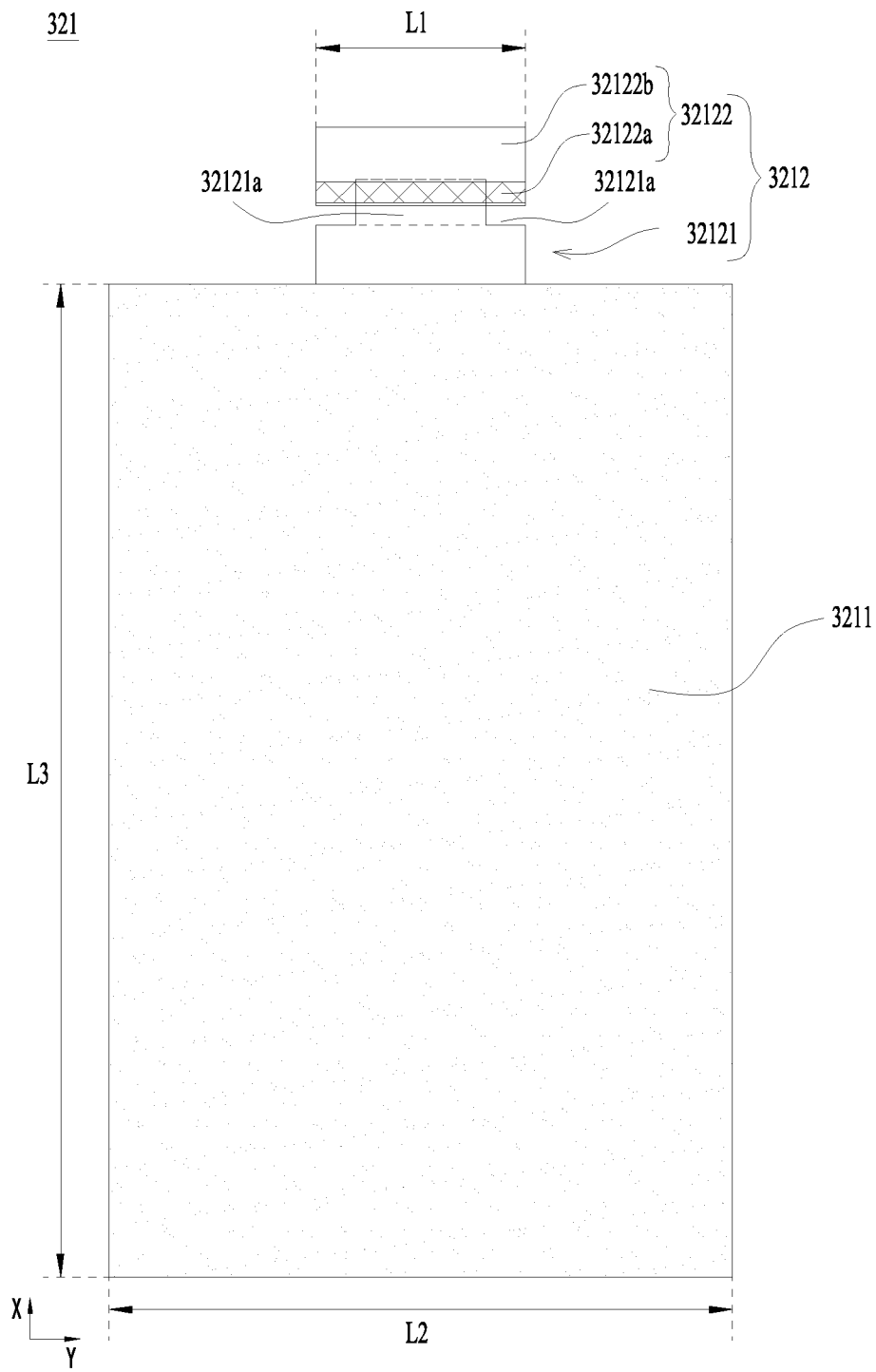
FIG. 14 is a partial top-view schematic structural diagram of an electrode assembly according to another embodiment.

In some optional embodiments, referring to FIG. 14, along the width direction Y of the electrode body 32a, the end that is of the body portion 32121 and that is away from the electrode plate 321 decreases in size to form the fuse portion 32121a. In an example, edges and corners of the end of the body portion 32121 may be trimmed off so that the end of the body portion 32121 decreases in size to form the fuse portion 32121a.

In some embodiments, referring to FIG. 14, the size of the protruding portion 3212 along the width direction Y of the electrode body 32a is L1. The size of the electrode plate 321 along the width direction Y of the electrode body 32a is L2. L1 and L2 satisfy: $\frac{1}{3} \times L2 \leq L1 \leq \frac{3}{4} \times L2$. For example, L1 may be $0.4 \times L2$, $0.5 \times L2$, $0.6 \times L2$, $0.7 \times L2$, or the like.

In some optional embodiments, the size L1 of the protruding portion 3212 along the width direction Y is 15 millimeters (mm) to 60 mm.

In some optional embodiments, the size of the electrode plate 321 along the length direction X of the electrode body 32a is L3. The size of the electrode plate 321 along the width direction Y of the electrode body 32a is L2. L3 and the width L2 satisfy: a ratio of L3 to L2 ranges from 4 to 20. For example, the ratio of L3 to L2 is an integer that falls within 4 to 20. The electrode assembly 32 according to this embodiment includes the protruding portion 3212 of a high current-carrying capacity. Therefore, the length of the electrode plate 321 can be increased to a greater extent, and a relatively wide range of a length-to-width ratio can be achieved, thereby helping to increase the energy density of the battery. In addition, fast charging of the battery can be implemented and the battery is not prone to overheating, thereby improving the safety of the battery in use.

In some optional embodiments, a sum of capacity of the active material layer 3211b on two surfaces of the metal substrate 3211a is C and is greater than 3 Ah but less than 10 Ah. The electrode assembly 32 according to this embodiment includes the protruding portion 3212 of a high current-carrying capacity. Therefore, the capacity of the electrode plate 321 can be increased to a greater extent, thereby helping to increase the energy density of the battery. In addition, fast charging of the battery can be implemented and the battery is not prone to overheating, thereby improving the charging efficiency.

Figure 15:
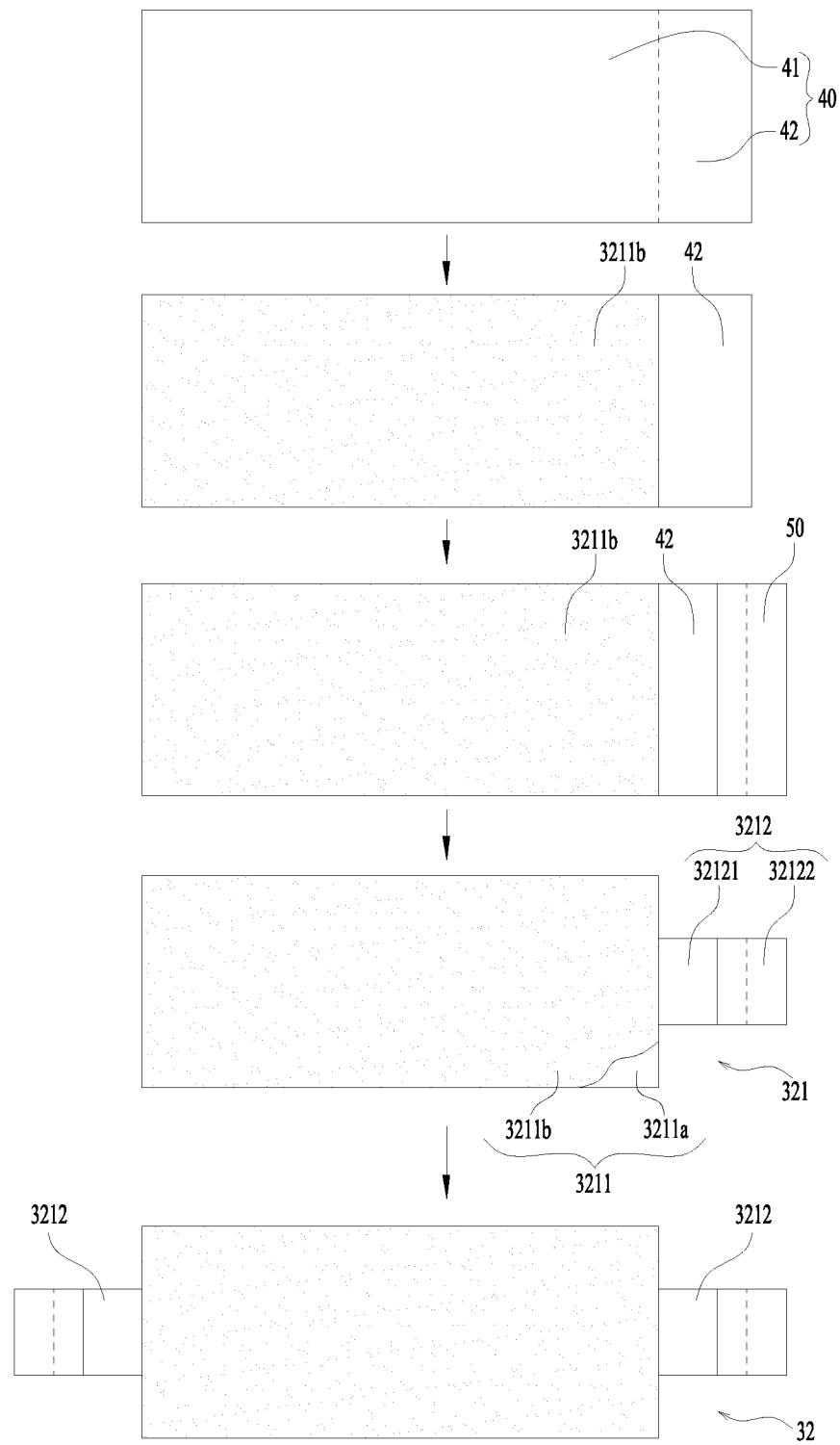
FIG. 15 is a schematic diagram of a method for manufacturing an electrode assembly according to an embodiment.
Figure 16:
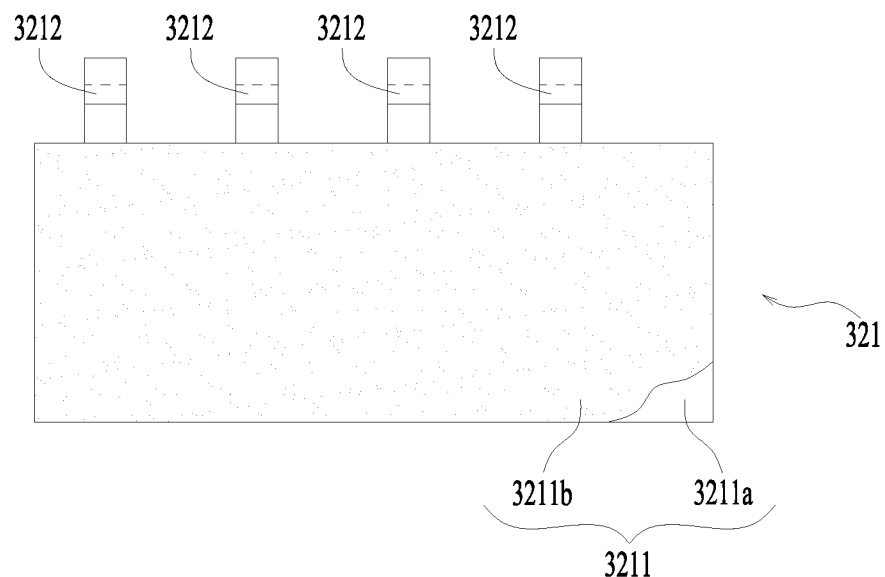
FIG. 16 is a partial schematic structural diagram of an electrode plate according to an embodiment.

Referring to FIG. 15, an embodiment further provides a method for manufacturing an electrode assembly 32, including:

providing a first sheet of material 40, where the first sheet of material 40 includes a first part 41 and a second part 42;

a coating step, that is, coating a surface of the first part 41 with an active material layer 3211b;

providing a second sheet of material 50, and connecting the second sheet of material 50 to the second part 42;

a material removing step, that is, removing a part of material from the second sheet of material 50 and the second part 42 to form an electrode plate 321 that includes a main portion 3211 and at least one protruding portion 3212, where the main portion 3211 includes the active material layer 3211b and a metal substrate 3211a corresponding to the active material layer 3211b, a thickness of at least a part of the protruding portion 3212 connected to the metal substrate 3211a is greater than a thickness of the metal substrate 3211a, the protruding portion 3212 includes a body portion 32121 and a conductive piece 32122 connected to the body portion 32121, a remainder of the second part 42 forms the body portion 32121, and a remainder of the second sheet of material 50 forms the conductive piece 32122; and a forming step, that is, winding or stacking the electrode plate 321 to form an electrode assembly 32, where the protruding portion 3212 protrudes from the metal substrate 3211a along a length direction of the electrode assembly 32.

In an embodiment, the electrode plate 321 includes a protruding portion 3212. Alternatively, referring to FIG. 16, the electrode plate 321 includes at least two protruding portions 3212. The at least two protruding portions 3212 are spaced apart.

The electrode assembly 32 manufactured by using the manufacturing method according to this embodiment includes at least one electrode plate 321. The electrode plate 321 includes a main portion 3211 and at least one protruding portion 3212. The protruding portion 3212 protrudes from the metal substrate 3211a along the length direction X of the electrode assembly 32. The protruding portion 3212 is connected to the metal substrate 3211a. Along the thickness direction Z of the electrode body 32a, the size of at least a part of the protruding portion 3212 is greater than the size of the metal substrate 3211a. Therefore, the protruding portion 3212 possesses a relatively large cross-sectional area, so as to achieve a low resistance of the protruding portion 3212. In addition, due to a high heat capacity of the protruding portion 3212, the protruding portion 3212 achieves a relatively high current-carrying capacity. In this way, for a strip-shaped electrode assembly 32 of which the size in the length direction X is greater than the size in the width direction Y, the electrode assembly 32 according to this embodiment effectively solves the problem of an insufficient current-carrying capacity of the protruding portion 3212 of the strip-shaped electrode assembly 32, and alleviates excessively rapid temperature rise of the protruding portion 3212 during charging or discharging of the electrode assembly 32. In addition, heat dissipation performance of the protruding portion 3212 is improved, thereby reducing a possibility of severe heat emission of the protruding portion 3212. This can effectively improve the charging and discharging efficiency of the battery, and can reduce overheating risks of the battery during charging or discharging and improve safety of battery in use.

Figure 17:
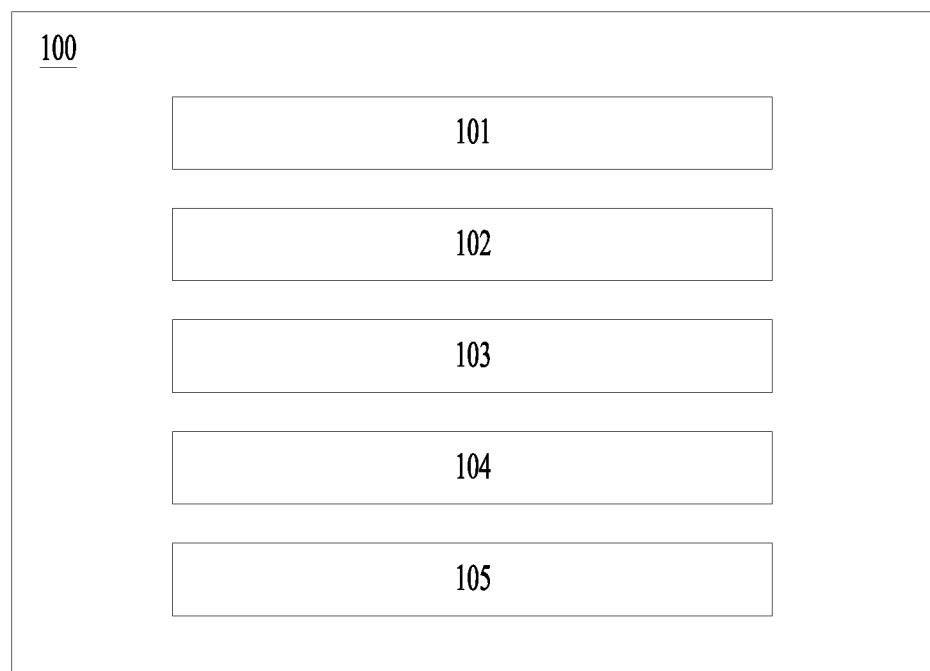
FIG. 17 is a schematic structural diagram of a device for manufacturing an electrode assembly according to an embodiment.

Referring to FIG. 17, an embodiment further provides a device 100 for manufacturing an electrode assembly 32, including:
- a first material processing apparatus 101, configured to provide a first sheet of material 40, where the first sheet of material 40 includes a first part 41 and a second part 42;
- a coating apparatus 102, configured to coat a surface of the first part 41 with an active material layer 3211b;
- a second material processing apparatus 103, configured to provide a second sheet of material 50, and connect the second sheet of material 50 to the second part 42;
- a material removing apparatus 104, configured to remove a part of material from the second sheet of material 50 and the second part 42 to form an electrode plate 321 that includes a main portion 3211 and at least one protruding portion 3212, where the main portion 3211 includes the active material layer 3211b and a metal substrate 3211a corresponding to the active material layer 3211b, a thickness of at least a part of the protruding portion 3212 connected to the metal substrate 3211a is greater than a thickness of the metal substrate 3211a, the protruding portion 3212 includes a body portion 32121 and a conductive piece 32122 connected to the body portion 32121, a remainder of the second part 42 forms the body portion 32121, and a remainder of the second sheet of material 50 forms the conductive piece 32122; and
- a forming apparatus 105, configured to wind or stack the electrode plate 321 to form an electrode assembly 32, where the protruding portion 3212 protrudes from the metal substrate 3211a along a length direction of the electrode assembly 32.

In some embodiments, the material removing apparatus 104 includes a cutter. The cutter is configured to cut the second sheet of material 50 and the second part 42 along a preset trail to remove a part of material from the second sheet of material 50 and the second part 42.

Although this application has been described with reference to exemplary embodiments, various improvements may be made to the embodiments without departing from the scope of this application, and the components of this application may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. An electrode assembly for a battery cell, the electrode assembly comprising:
    an electrode plate extending horizontally along a length direction of the electrode assembly and extending vertically along a thickness direction of the electrode assembly, the electrode plate comprising a main portion and at least one protruding portion connected to the main portion, wherein the main portion comprises a metal substrate and an active material layer coated on a surface of the metal substrate, the protruding portion protrudes from the metal substrate along the length direction of the electrode assembly, wherein
    along the thickness direction of the electrode assembly, a size of at least a part of the protruding portion is greater than a size of the metal substrate,
    wherein the protruding portion comprises a body portion and a conductive piece, the body portion and the conductive piece being stacked in the thickness direction,
    wherein the conductive piece comprises a first connecting portion and a second connecting portion, the first connecting portion is configured to connect the body portion, the second connecting portion protrudes from an end that is of the body portion and that is away from the active material layer, and the second connecting portion is configured to implement electrical connection to an external part,
    wherein the body portion further comprises a partitioning groove and a plurality of fuse portions arranged along a width direction of the electrode assembly, the fuse portions are connected to the first connecting portion of the conductive piece and partitioned by the partitioning groove.

2. The electrode assembly according to claim 1, wherein the protruding portion and the metal substrate are made of a same material and integrally disposed.

3. The electrode assembly according to claim 1, wherein, along the thickness direction, a size of the body portion is equal to the size of the metal substrate.

4. The electrode assembly according to claim 1, wherein the body portion, the metal substrate, and the conductive piece are made of a same material.

5. The electrode assembly according to claim 1, wherein the conductive piece and the body portion are made of different materials, and a resistivity of the conductive piece is less than a resistivity of the body portion.

6. The electrode assembly according to claim 1, wherein an end that is of the conductive piece and that is away from the active material layer is substantially co-planar with an end that is of the body portion and that is away from the active material layer in the thickness direction, and an overlap region between the conductive piece and the body portion along the thickness direction is configured to implement electrical connection to an external part.

7. The electrode assembly according to claim 1, wherein, along the thickness direction, a size of the second connecting portion is greater than or equal to a size of the body portion.

8. The electrode assembly according to claim 1, wherein the conductive piece is two in number, and the two conductive pieces are connected to two surfaces of the body portion respectively.

9. The electrode assembly according to claim 8, wherein, along the thickness direction, a sum of sizes of the second connecting portions of the two conductive pieces is greater than or equal to a size of the body portion.

10. The electrode assembly according to claim 1, wherein the fuse portions are welded to the conductive piece.

11. The electrode assembly according to claim 10, wherein, a protection layer is disposed at a root portion that is of the body portion and that is proximate to the active material layer, and a weld region between the conductive piece and the body portion is spaced apart from the protection layer, wherein the protection layer and the active material layer are made of the same material.

12. The electrode assembly according to claim 1, wherein the electrode assembly comprises at least two electrode plates, and the at least two electrode plates are stacked along the thickness direction.

13. The electrode assembly according to claim 12, wherein a size of the protruding portion along a width direction of the electrode assembly is L1, a size of each of the electrode plates along the width direction is L2, and L1 and L2 satisfy: ⅓×L2≤L1≤¾×L2.

14. The electrode assembly according to claim 12, wherein a size of each of the electrode plates along the length direction of the electrode assembly is L3, a size of each of the electrode plates along a width direction of the electrode assembly is L2, and L3 and L2 satisfy: a ratio of L3 to L2 ranges from 4 to 20.

15. A battery cell, comprising the electrode assembly according to claim 1.

16. A battery, comprising a battery cell, wherein the battery cell comprises an electrode assembly, and the electrode assembly comprises:
an electrode plate extending horizontally along a length direction of the electrode assembly and extending vertically along a thickness direction of the electrode assembly, the electrode plate comprising a main portion and at least one protruding portion connected to the main portion, wherein the main portion comprises a metal substrate and an active material layer coated on a surface of the metal substrate, the protruding portion protrudes from the metal substrate along the length direction of the electrode assembly, wherein
along the thickness direction of the electrode assembly, a size of at least a part of the protruding portion is greater than a size of the metal substrate,
wherein the protruding portion comprises a body portion and a conductive piece, the body portion and the conductive piece being stacked in the thickness direction,
wherein the conductive piece comprises a first connecting portion and a second connecting portion, the first connecting portion is configured to connect the body portion, the second connecting portion protrudes from an end that is of the body portion and that is away from the active material layer, and the second connecting portion is configured to implement electrical connection to an external part,
wherein the body portion further comprises a partitioning groove and a plurality of fuse portions arranged along a width direction of the electrode assembly, the fuse portions are connected to the first connecting portion of the conductive piece and partitioned by the partitioning groove.

17. An electrical apparatus, comprising a battery, wherein the battery is configured to provide electrical energy, the battery comprises a battery cell, the battery cell comprises an electrode assembly, and the electrode assembly comprises:
an electrode plate extending horizontally along a length direction of the electrode assembly and extending vertically along a thickness direction of the electrode assembly, the electrode plate comprising a main portion and at least one protruding portion connected to the main portion, wherein the main portion comprises a metal substrate and an active material layer coated on a surface of the metal substrate, the protruding portion protrudes from the metal substrate along the length direction of the electrode assembly, wherein
along the thickness direction of the electrode assembly, a size of at least a part of the protruding portion is greater than a size of the metal substrate,
wherein the protruding portion comprises a body portion and a conductive piece, the body portion and the conductive piece being stacked in the thickness direction,
wherein the conductive piece comprises a first connecting portion and a second connecting portion, the first connecting portion is configured to connect the body portion, the second connecting portion protrudes from an end that is of the body portion and that is away from the active material layer, and the second connecting portion is configured to implement electrical connection to an external part,
wherein the body portion further comprises a partitioning groove and a plurality of fuse portions arranged along a width direction of the electrode assembly, the fuse portions are connected to the first connecting portion of the conductive piece and partitioned by the partitioning groove.

* * * * *